(12) United States Patent
Leijon (10) Patent No.: US 8,726,651 B2
(45) Date of Patent: May 20, 2014

(54) HYDROPOWER PLANT PROVIDED WITH A GRATING AND METHOD FOR OPERATING A SUCH

(75) Inventor: Mats Leijon, Uppsala (SE)

(73) Assignee: Current Power Sweden AB, Västerås (SE)

( * ) Notice: Subject to any disclaimer, the term of this patent is extended or adjusted under 35 U.S.C. 154(b) by 253 days.

(21) Appl. No.: 13/059,549

(22) PCT Filed: Aug. 18, 2008

(86) PCT No.: PCT/SE2008/050929
§ 371 (c)(1),
(2), (4) Date: Apr. 28, 2011

(87) PCT Pub. No.: WO2010/021574
PCT Pub. Date: Feb. 25, 2010

(65) Prior Publication Data
US 2011/0197578 A1    Aug. 18, 2011

(51) Int. Cl.
*F03B 13/18* (2006.01)
*F03B 11/08* (2006.01)

(52) U.S. Cl.
USPC .................................. 60/497; 415/121.2

(58) Field of Classification Search
USPC .............. 60/638–639; 415/140–141, 121.2; 416/247 R, 247 A
See application file for complete search history.

(56) References Cited

U.S. PATENT DOCUMENTS

| 1,489,624 A | 4/1924 | Zottoli |
| 5,391,926 A * | 2/1995 | Staley et al. .................... 290/55 |
| 7,211,905 B1 * | 5/2007 | McDavid, Jr. ............. 180/65.31 |
| 2004/0101397 A1 * | 5/2004 | Godsall et al. ................. 415/3.1 |
| 2006/0222483 A1 * | 10/2006 | Seiford, Sr. .................... 415/4.4 |
| 2009/0026767 A1 * | 1/2009 | Petrounevitch ................. 290/53 |

FOREIGN PATENT DOCUMENTS

| DE | 44 18 790 A1 | 11/1995 |
| GB | 209005 | 12/1923 |
| GB | 210937 | 2/1924 |
| WO | 91/19093 | 12/1991 |
| WO | 92/03656 | 3/1992 |

* cited by examiner

*Primary Examiner* — Thomas Denion
*Assistant Examiner* — Brian Inacay
(74) *Attorney, Agent, or Firm* — Drinker Biddle & Reath LLP (57) ABSTRACT

The invention relates to a hydropower plant including a water turbine submerged in a water current, A grating is located adjacent the water turbine. According to the invention the grating is arranged to guide the water flow in the water current such that the velocity of the water between the grating and the water turbine becomes non-uniform. The invention also relates to a use of the hydropower plant for generating electric energy for supply to an electric network. Further the invention relates to a method for operating a hydropower plant.

16 Claims, 5 Drawing Sheets

HYDROPOWER PLANT PROVIDED WITH A GRATING AND METHOD FOR OPERATING A SUCH

RELATED APPLICATION DATA

This application is a §371 National Stage Application of PCT International Application No. PCT/SE2008/050929 filed Aug. 18, 2008.

FIELD OF INVENTION

The present invention in a first aspect relates to a hydropower plant including at least one water turbine submerged in a water current and a grating located adjacent the water turbine.

In a second aspect the invention relates to a use of such a hydropower plant.

In a third aspect the invention relates to a method for operating a hydropower plant which method includes exposing a submerged water turbine to a water flow in a water course and providing a grating adjacent the water turbine.

BACKGROUND OF THE INVENTION

In hydropower plants it is often necessary to provide a grating upstream of is the water turbine in order to prevent objects, such as dead animals, plants, wastes etc., flowing in the water to reach the turbine. These could otherwise disturb the operation or even damage the turbine.

For a water turbine operating in running water, the power that can be generated from the water depends on many factors. An important factor is the mass flow rate to which the turbine is exposed, i.e. the product of the mass and the velocity of the water. Further the turbine facing the water flow will be unevenly affected in different parts of its face against the water. In some parts the contribution to the power generation is high, in other parts smaller and in some parts even negative for certain kinds of turbines. An uneven distribution of the contribution to the power generation is in principle present for most types of water turbines. However this is particularly the case for turbines having a shaft perpendicular to the main direction of the water flow, such that the water passes the turbine in the radial direction. For such turbines half of the turbine rotates against the direction of the water flow and on this side the contribution to the power generation is negative.

Most hydropower plants are operated in rapid running water where the high velocity is obtained by a substantial vertical fall of the water. The energy density in the water is high, and the water flow is optimally directed to the turbine. The high power output thus received is based on making use of the potential energy of a higher level when it is transferred to kinetic energy in the rapid flow through the turbine.

A large, not yet much exploited energy source, however can also be found in slowly running water, such as calm rivers, sea currents and tide currents. Although the velocity here is much lower than in conventional hydropower plants the water volume is very high. In the product mass×velocity representing the kinetic energy in the water, the factor mass in such a hydropower plant is much more dominating then in a conventional plant. Since the velocity is small, changes in the velocity can affect the kinetic energy of the water considerably.

Therefore the result of an uneven distribution of the contribution to the generated power discussed above is more important to pay attention to in these types of plants.

The object of the present invention is to optimize the output of a water turbine in a hydropower plant in consideration of the uneven distribution in the turbine of the contribution to the power generation.

SUMMARY OF THE INVENTION

The object of the invention is according to the first aspect of the invention achieved in that a hydropower plant of the kind initially specified includes the specific feature that the grating is arranged to guide the water flow in the water current such that the velocity of the water between the grating and the water turbine becomes non-uniform.

The invention is particularly but not exclusively intended for water turbines having the axis perpendicular to the main direction of the water flow and for applications where the water velocity is relatively low.

Of course any grating upstreams of the turbine will theoretically have a certain effect on the velocity profile of the water flow. The bars of a grating might course turbulence locally affecting the velocity in the main flow direction. On a micro level thus there might be minor fluctuations in the velocity profile of the water front. A non-uniform velocity, however, in this application is defined as being on a macro level in relation to the above mentioned minor fluctuations.

A deviation from an exact uniform velocity profile can also occur due to external conditions such as the shape of the watercourse or the distance to the bottom. Deviations as a result of such external conditions do not represent a non-uniform velocity in the sense of the present application.

By arranging the grating such that it guides the water flow in this way the water can be guided such that it has a higher velocity in those parts of the turbine where the contribution to the power generation is higher and such that the water has a lower velocity in those parts of the turbine where the contribution is lower or even negative. Thereby the total output of the turbine will be increased and consequently the over all efficiency of the plant will be corresponding higher.

To guide the water flow towards the turbine requires elements to carry out this task. This increases the total investment cost for the plant. However, by using the grating for this purpose the extra cost will be negligable since the grating in most cases need to be present for its ordinary purpose. Since the grating thereby fulfils two different functions the plant according to the invention is cost effective.

According to a preferred embodiment of the invented hydropower plant the axis of the water turbine has a direction that is mainly perpendicular to the water flow, thereby defining a first half of the water turbine that rotates with the water and a second half that rotates against the water.

Since this type of turbine has a part that contributes negatively to the power generation the effect of affecting the velocity distribution is of particularly interest for these types.

According to a further preferred embodiment the grating is arranged such that the mean velocity of the water reaching the first half is higher than the mean velocity of the water reaching the second half.

The active half of the turbine, i.e. the half that rotates with the water thereby will have an increased power generation whereas the negative effect of the second half is reduced.

According to a further preferred embodiment the grating is arranged such that the velocity profile of the water reaching the water turbine has a maximum in the water tangentially reaching said first half and a minimum in the water tangentially reaching said second half.

The water reaching the first half of the turbine tangentially, i.e. the laterally outmost part has the highest contribution to the power generation. To have a maximal velocity in this region therefore is particularly advantageous. Correspondingly it is advantageous to have as low velocity as possible at the opposite lateral side of the turbine since this minimizes the breaking effect on this side.

According to a further preferred embodiment the grating includes a plurality of bars forming gaps between each other, the cross section of a bar perpendicular to the longitudinal extension thereof having a length defined as the distance between a nose point where the water flow reaches the bar and a tail point where the water flow leaves the bar, having a bar width measured perpendicular to said length, and having a guiding direction defined as the direction of said length, and wherein the grating varies with respect to at least one of the parameters; said length, said width, said guiding direction, the area of said cross section and/or the profile of said cross section such that said at least one parameter varies from one bar to another for at least some bars and/or such that said at least one parameter varies along the extension of one bar.

A grating in the form of a plurality of bars is advantageous with respect to its function as a protecting shield for the turbine against objects as well as to its function to guide the water flow, in particular when the required guiding is in one dimension, which usually is the case.

The guiding thus can be accomplished by various measures taken with regards to the design of the grating. In many cases the guiding effect is achieved by varying only one of the parameters whereas in other cases more than one variation is appropriate. The size of the turbine, the general velocity of the water current, the location of the plant and other conditions together with cost considerations are to consider when choosing which of and to which extent the parameters are to be varied. In most applications it is efficient and advantageous to vary the guiding directions such that it is different for different bars.

According to a further preferred embodiment the grating includes a plurality of bars forming gaps between each other, each gap forming a gap with and wherein the gap width varies from one gap to another for at least some gaps and/or varies along the extension of one gap.

Varying the gap with in either or both of these ways is also an alternative that effectively can guide the water flow to the desired velocity profile.

According to a further preferred embodiment the grating includes a plurality of bars, wherein at least some of the bars have different distance than other bars to a plane through the axis of the water turbine, which plane is perpendicular to the water flow, such that centrally located bar have longer distance to said plane than laterally located bars. Thereby a generally concave shape of the grating as seen from the turbine axis is formed. The protective effect of the grating is improved since the turbine thereby will be more encapsulated. The difference in that distance between different bars is also a parameter that can be used to affect the velocity profile of the water flow.

According to a further preferred embodiment the longitudinal extension of the bars is substantially parallel to the axis of the water turbine.

With this orientation of the bars the grating will be adapted to perform the guiding in the very direction which corresponds to the direction along which the non-uniform velocity profile is useful for optimizing the power generation.

According to a further preferred embodiment the grating has a first set of bars and a second set of bars arranged such that the bars of the first set cross the bars of the second set.

This embodiment is suitable in such causes when a non-uniform velocity distribution is desirable in two dimensions.

Such a grating will also better protect the turbine against thin but elongated objects which otherwise might pass through the grating.

According to a further preferred embodiment the grating is adjustable with respect to its guiding properties.

Although such an embodiment becomes more complicated and thereby costly it will for certain applications be useful and compensate for the cost increase by an increase in the efficiency of the turbine. This can be the case e.g, when the turbine is located where the external conditions undergo changes, such as a change in the general velocity of the water current.

According to a further preferred embodiment the shaft of the water turbine is vertical.

This provides a robust plant and the turbine will be easy to mount. A vertical arrangement is also in most cases appropriate to cooperate with a guiding grating such that the desired velocity profile can be achieved in a simple manner.

According to a further preferred embodiment the shaft is supported by a foundation on the bed of the watercourse, and the grating is supported by the same foundation as the shaft.

Mounting the turbine on a bed at the bottom leads to a secure, rigid and simple construction. By using the same foundation for the grating also the latter will be securely mounted, and the relation between the turbine and the grating is robustly maintained.

According to a further preferred embodiment the water turbine is arranged for a rotation in the range of 0.5 to 50 rpm.

Since the aspect of the velocity distribution is more important for relatively slowly rotating turbines, the invention is particularly useful for turbines within this range of rotation. In most cases the rotation will be in the range of 2-20 rpm.

According to a further preferred embodiment the plant includes a plurality of water turbines and each turbine has an individual grating. Thereby the velocity distribution can be optimized for each of the turbines, resulting in an optimal efficiency for the plant as a whole. By this arrangement each grating can be individually tailored for the respective turbine taking into account the relative position of the turbines and the size of the respective turbine.

According to a further preferred embodiment the plant includes a plurality of water turbines and a grating is in common for at least some of the turbines.

In some applications a sufficient velocity distribution can be achieved for a plurality of turbines with one single grating for these. This simplifies the plant and lowers the installation costs for the grating.

The above preferred embodiments of the invented hydropower plant are set out in the claim depending from claim 1.

In to the second aspect of the invention the object is met in that the invented hydropower plant is used for generating electric energy for supply to an electric network.

In the third aspect of the invention the object is met in that a method for operating a hydropower plant of the kind initially specified includes the specific measures that the grating is arranged such that it affects the velocity of the water between the grating and the water turbine to become non-uniform.

According to preferred embodiments of the invented method it is performed with a hydropower plant according to the present invention, and in particular to any of the preferred embodiments thereof.

By the invented use and the invented method advantages are gained corresponding to those gained by the invented hydropower plant and the preferred embodiments thereof and which have been described above.

The invention will be explained further by the following detailed description of examples of the invention and with reference to the accompanying drawings.

DETAILED DESCRIPTION OF EXAMPLES OF THE INVENTION

Figure 1:
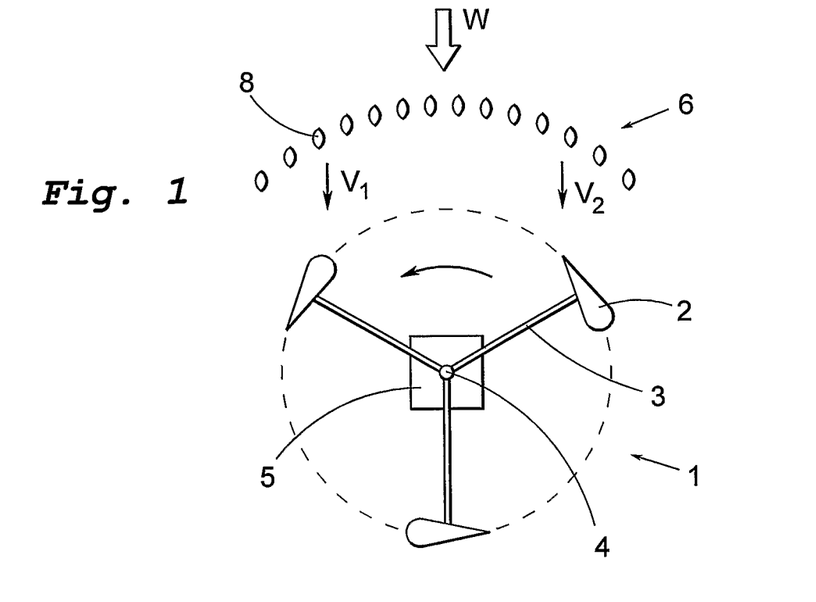
FIG. 1 is a view from above of a hydropower plant according to a first example of the invention.

FIG. 1 in a view from above schematically illustrates a hydropower plant. The plant may consist of one single water turbine 1 as in the figure or a plurality of turbines. The turbine 1 is arranged in a water flow indicated by arrow W. The turbine has it axis mainly perpendicular to the water flow and is in the illustrated example vertically mounted. The turbine has three vanes 2 extending in parallel to the turbine axis, which vanes 2 are connected to the turbine shaft 4 via arms 3. The bottom end of the shaft 4 is connected to a generator 5. Upstreams of the turbine 1 is provided a grating 6 with vertical bars 8 to prevent objects flowing with the water to reach the turbine. As indicated by the arrow the turbine rotates in the counter-clockwise direction as consequence of the shape of the vanes 2.

The grating 6 is designed such that it directs the water flowing through it towards that half of the turbine that creates the torque, i.e. the left side of the figure. This result in a higher water velocity $V_1$ in this part and a lower water velocity $V_2$ in the other half of the turbine, i.e. the right side in the figure. In the following these sides will be called the feeding side and the consuming side respectively.

The torque generated on a blade increases with increasing velocity. The torque generated on the feeding side with the velocity $V_1$ which is higher than the velocity $V_0$ occurring in a normal plant with uniform velocity, thus will be increased. Corresponding the breaking torque on the consuming side with the velocity $V_2$ which is lower than $V_0$ will be decreased in comparison with a conventional plant. These two effects add up to a higher power generated by the turbine.

Figure 2:
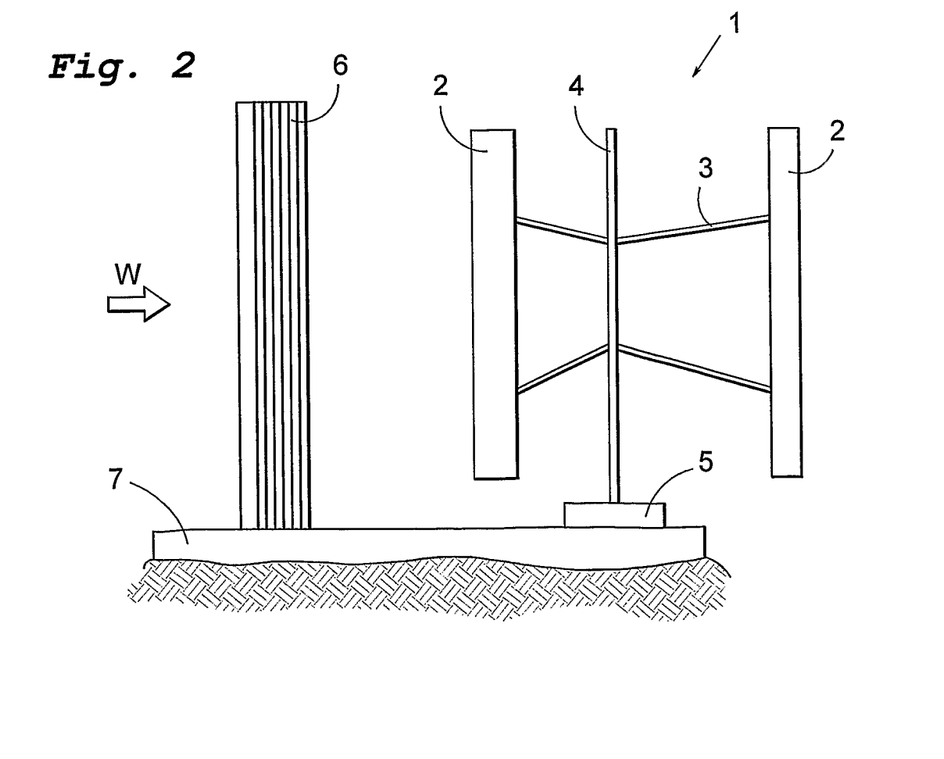
FIG. 2 is a side view of the plant of FIG. 1.

In FIG. 2 illustrating the plant of FIG. 1 from the side it can be seen that the vertically mounted turbine 1 is supported by a foundation 7 on the bed of the watercourse. The grating 6 is mounted on the same foundation 7.

The turbine 1 illustrated in FIGS. 1 and 2 is primarily adapted for slow rotation, typically around 10 rpm. It is suitable for location in rivers and sea currents. The dimensions of the turbine can be quite large and thus have a diameter of many ten meters.

In FIG. 1 the grating is only schematically illustrated. The arrangement of the grating 6 to achieve a certain velocity distribution between the grating and the turbine can be made in various ways. FIGS. 3 to 7 illustrate some alternatives.

Figure 3:
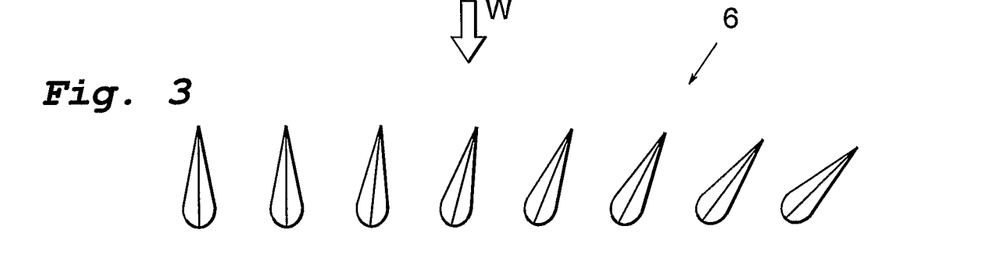
FIG. 3 is a view from above of a detail of FIG. 1.

In FIG. 3 each bar 8 in the grating 6 has substantially the same cross section. Each bar has an elongated flow-dynamically adapted shape and defines a chord representing the length of the cross section profile and also represents the direction of the bar profile.

The guiding effect is achieved in that the angle of each bar 8 towards the flow direction W before the grating is varied. In the bars to the left the chord is in parallel to the flow direction W. Further to the right the chord forms an angle to the flow direction W, which angle increases the more to the right in the figure the bar is located. Thereby the velocity of the water downstream the grating will be larger at the left side and smaller at the right side corresponding to what is illustrated in FIG. 1.

Figure 4:
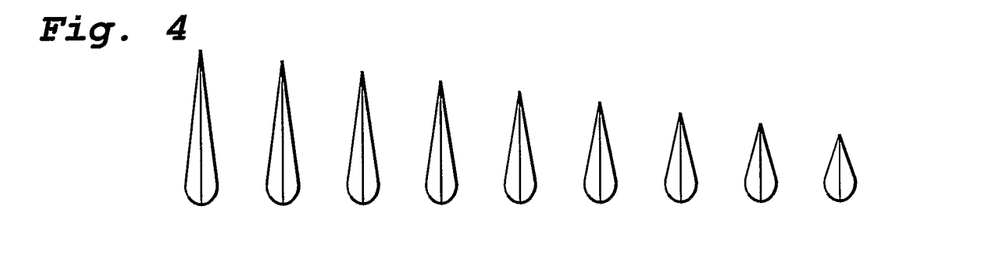
FIG. 4-7 in views similar to FIG. 3 illustrate alternative examples of the detail in FIG. 3.

FIG. 4 illustrates an alternative example of the grating design for achieving a non-uniform water velocity downstream of the grating. In this example the chord length of the bars is varied whereas the width, the angle and the gaps between the bars are constant.

Figure 5:
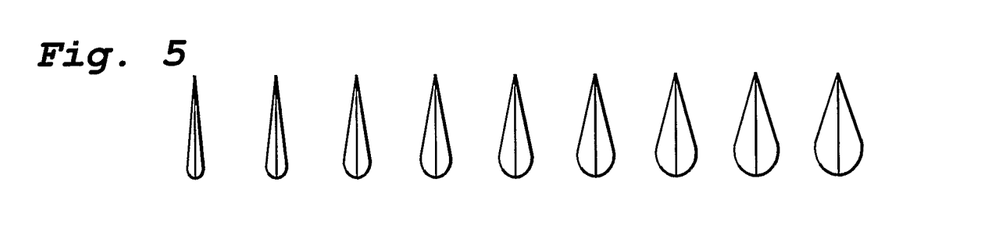

In FIG. 5 the width of the bars is varied, whereas the chord length and the angle are constant.

Figure 6:
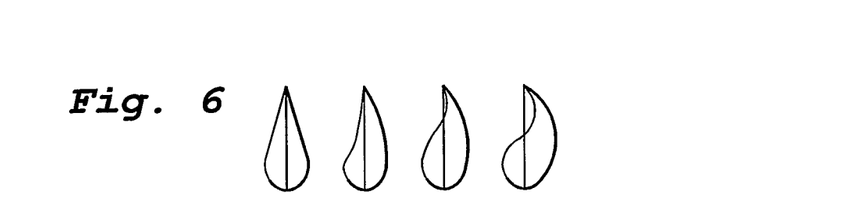

In FIG. 6 the camber of the bars is varied such that each bar has a different degree of asymmetry in the profile. The chord length and the angle are constant.

Figure 7:
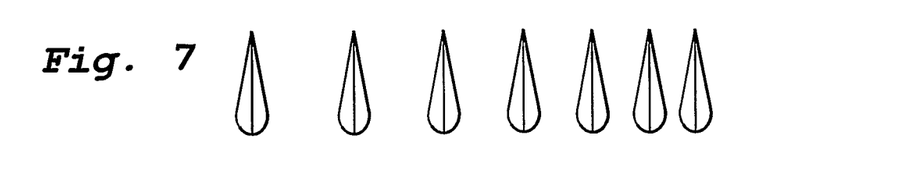

In FIG. 7 the gap between the bars is varied, whereas the cross section is substantially the same for all bars.

It is to be understood that the examples illustrated in FIGS. 3 to 7 for achieving a non-uniform velocity distribution can be combined with each other.

Figure 8:
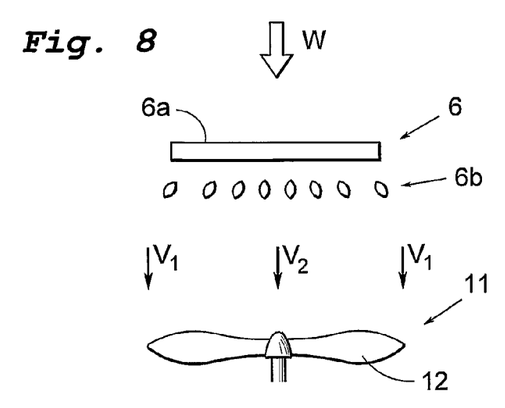
FIG. 8 is a view from above of a hydropower plant according to a further example of the invention.

Although the invention is of particularly interest for turbines having the axis perpendicular to the water flow it can be applied also for other kind of turbines. FIG. 8 illustrates an axial turbine having its axis in parallel with the water flow W. The grating 6 consists of two sets of bars 6a, 6b crossing each other. Each set of bars guides the water flow such that the velocity is higher $V_1$ at the sides and lower $V_2$ in the middle. The outer part of each blade 12 will thereby generate an increased torque and the inner part a decreased torque. However the total torque on the turbine is increased.

Figure 9:
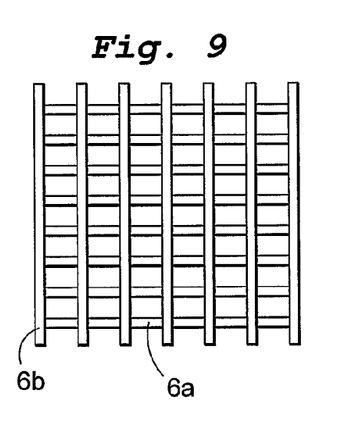
FIG. 9 is a side view of a detail of FIG. 8.

FIG. 9 illustrates the grating as seen in the flow direction. The bars do not necessarily cross each other at right angles. Of course the grating also in this case can consist of only one set of bars, which however will reduce the torque increasing effect.

A grating with two sets of bars as in the example in FIGS. 8 and 9 can also be used in connection with a turbine of the kind illustrated in FIGS. 1 and 2. This might be of interest for example in an application where the water velocity in a river varies with the distance to the bottom. In that case one set of bars can be used to counteract this velocity difference in order to create a more uniform velocity difference in order to create a more uniform velocity distribution in the vertical dimension. The other set of bars is used to create a non-uniform velocity distribution in the horizontal dimension as illustrated in FIG. 1.

Figure 10:
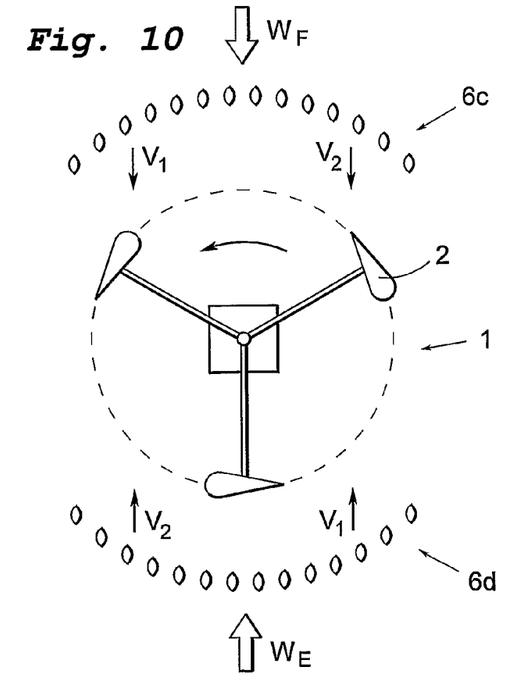
FIG. 10-12 are views from above of hydropower plants according to still further examples of the invention.

FIG. 10 illustrates an example when a turbine 1 is located in the sea where there is tide water, such that the tide current is in opposite directions when it is flood $W_F$ and ebb $W_E$ respectively. For that reason a grating 6c, 6d is provided on opposite sides of the turbine 1. At flood the grating 6c is active and guides the water flow towards a velocity distribution corresponding to that explained in connection with FIG. 1. At ebb the grating 6d is the active one and guides the water so that the velocity is highest on the right side, which now is the feeding side.

Figure 11:
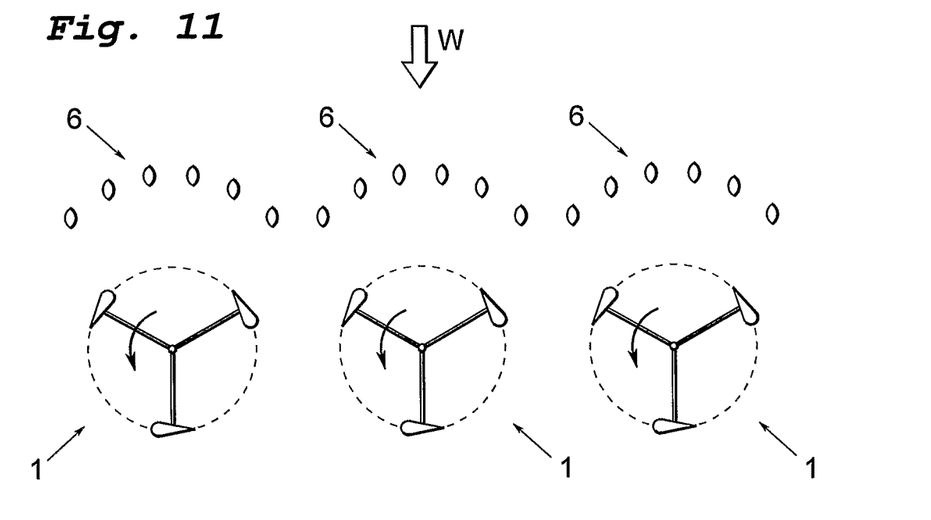

FIG. 11 illustrates an example where the hydropower plant has a plurality of turbines 1. In this case each turbine 1 has its own separate grating 6.

Figure 12:
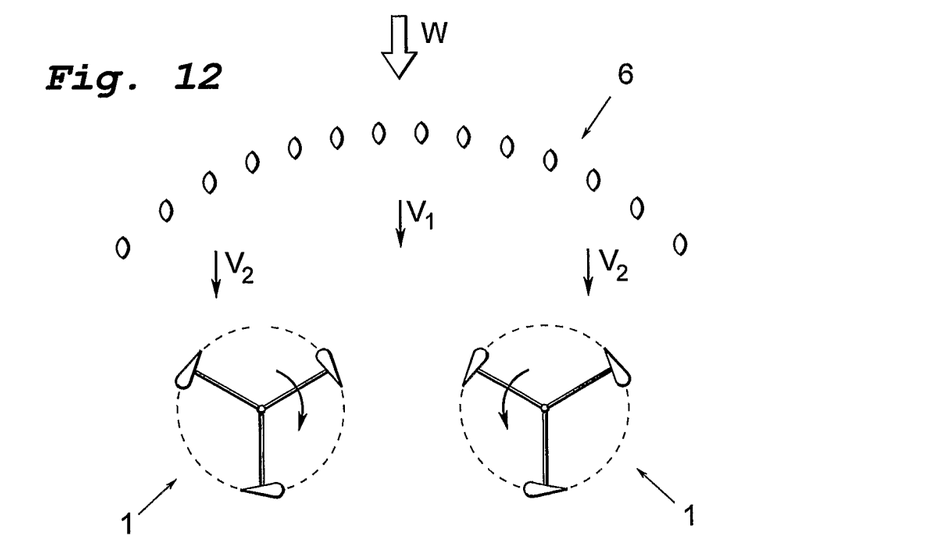

FIG. 12 illustrates an example where two turbines 1 in a hydropower plant has a common grating 6. In this case the left turbine rotates clockwise and the right turbine counter-clockwise. The grating 6 is arranged to guide the water such that the velocity is higher $V_1$ in the middle and lower $V_2$ on the outer side of each turbine 1. Each turbine thereby will have the high velocity on its feeding side and the low velocity on its consuming side.

Figure 13:
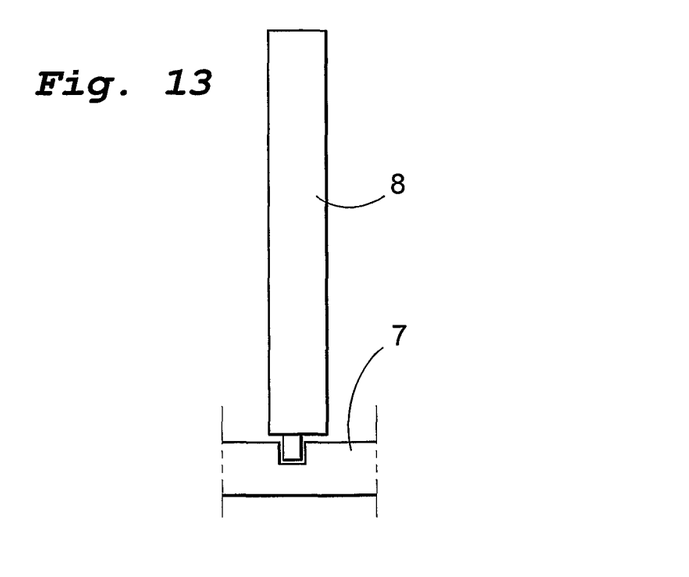
FIG. 13 is a side view of a bar in a grating according to a still further example.

FIG. 13 illustrates one bar 8 of a grating, which bar is turnable journalled in the foundation 7. Thereby the bar can be turned around its longitudinal axis and thereby its angle to the water flow direction can be adjusted.

Figure 14:
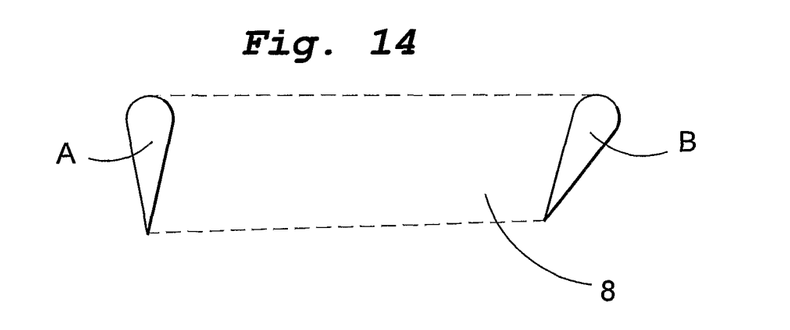
FIGS. 14 and 15 are illustrations of a bar in a grating according to still further examples.

FIG. 14 illustrates a bar 8 that is twisted, such that the profile A at one end thereof has another direction than the profile 13 at the opposite end.

Figure 15:
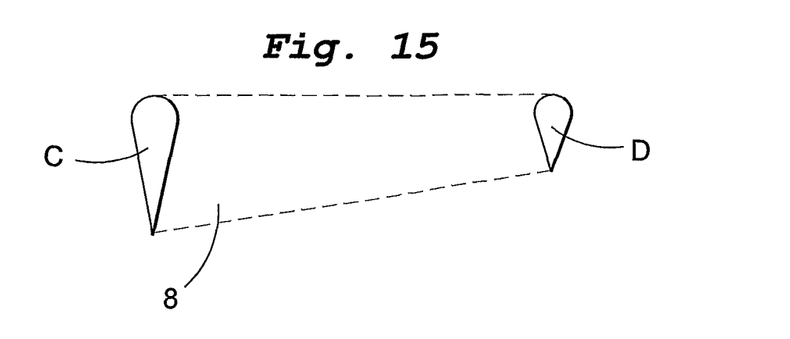

FIG. 15 illustrates a bar 8 that has a varying cross section area, such that the cross section C at one end is larger than the cross section D at the opposite end.

By arrangements as those in FIGS. 14 and 15 a non-uniform velocity distribution can be achieved along the direction of the bars, i.e. perpendicular to the velocity distribution achieved with the examples relating to FIGS. 3 to 7.

By combining the arrangement according to that of any of FIGS. 3 to 7 with that of FIG. 14 or 15 a two-dimensional velocity distribution can be achieved.

The invention claimed is:

1. A method for operating a hydropower plant comprising the steps of:
    exposing a submerged water turbine to a wafer flow in a watercourse such that the water turbine rotates at a speed in a range of 0.5-50 rpm, the water turbine having a plurality of vanes extending in parallel to a rotational axis of the water turbine and connected to a shaft of the turbine via arms; and
    providing a grating adjacent to the water turbine to prevent objects from flowing in the water from reaching the turbine,
    wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
    wherein the grating includes a plurality of bars forming gaps between each other, the cross section of a bar perpendicular to the longitudinal extension thereof having a length defined as the distance between a nose point where the water flow reaches the bar and a tail point where the water flow leaves the bar, having a bar width measured perpendicular to said length, and having a guiding direction defined as the direction of said length,
    wherein the gaps between the bars of the grating are substantially smaller than a tangential distance between adjacent vanes of the water turbine, and
    wherein the grating varies with respect to at least one of the parameters; said length, said width, said guiding direction, the area of said cross section, and the profile of said cross section such that said at least one parameter varies from one bar to another for at least some bars, and such that said at least one parameter varies along the longitudinal extension of one bar.

2. A method for operating a hydropower plant comprising the steps of:
    exposing a submerged water turbine to a wafer flow in a watercourse such that the water turbine rotates at a speed in a range of 0.5-50 rpm, the water turbine having a plurality of vanes extending in parallel to a rotational axis of the water turbine and connected to a shaft of the turbine via arms; and
    providing a grating adjacent to the water turbine to prevent objects from flowing in the water from reaching the turbine,
    wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
    wherein the grating includes a plurality of bars defining gaps between each other, each gap forming a gap width,
    wherein the gaps between the bars of the grating are substantially smaller than a tangential distance between adjacent vanes of the water turbine, and
    wherein the gap width varies from one gap to another for at least one of some gaps and varies along the longitudinal extension of one gap.

3. A method for operating a hydropower plant comprising the steps of:
    exposing a submerged water turbine to a wafer flow in a watercourse such that the water turbine rotates at a speed in a range of 0.5-50 rpm, the water turbine having a plurality of vanes extending in parallel to a rotational axis of the water turbine and connected to a shaft of the turbine via arms; and
    providing a grating adjacent to the water turbine to prevent objects from flowing in the water from reaching the turbine,
    wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
    wherein the grating includes a plurality of bars defining gaps between each other,
    wherein the gaps between the bars of the grating are substantially smaller than a tangential distance between adjacent vanes of the water turbine,
    wherein at least some of the bars have different distance than other bars to a plane through the axis of the water turbine, which plane is perpendicular to the water flow, such that centrally located bars have a longer distance to said plane than laterally located bars, and
    wherein the location of the grating is defined in relation to a tangential plane through the outer periphery of the water turbine, the tangential plane being parallel to the plane through the rotational axis of the water turbine such that the grating is located on the side of the tangential plane that is located opposite to the plane through the rotational axis.

4. A hydropower plant comprising:
a water turbine having a plurality of vanes extending in parallel to a rotational axis of the water turbine and connected to a shaft of the turbine via arms, the water turbine being configured to rotate in a range of 0.5-50 rpm submerged in a water current; and
a grating located adjacent the water turbine, the grating configured to prevent objects from flowing in the water from reaching the turbine,
wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
wherein the grating includes a plurality of bars defining gaps between each other, the cross section of a bar perpendicular to the longitudinal extension thereof having a length defined as the distance between a nose point where the water flow reaches the bar and a tail point where the water flow leaves the bar, having a bar width measured perpendicular to said length, and having a guiding direction defined as the direction of said length,
wherein the gaps between the bars of the grating are substantially smaller than a tangential distance between adjacent vanes of the water turbine, and
wherein the grating varies with respect to at least one of the parameters; said length, said width, the area of said cross section, and the profile of said cross section such that said at least one parameter varies from one bar to another for at least some bars, and such that said at least one parameter varies along the longitudinal extension of one bar.

5. A hydropower plant according to claim 4 wherein the axis of the water turbine has a direction that is mainly perpendicular to the water flow, thereby defining a first half of the water turbine that rotates with the water and a second half that rotates against the water.

6. A hydropower plant according to claim 4 wherein the longitudinal extension of the bars is substantially parallel to the axis of the water turbine.

7. A hydropower plant according to claim 4 wherein the grating has a first set of bars and a second set of bars arranged such that the bars of the first set cross the bars of the second set.

8. A hydropower plant according to claim 4 wherein the grating is adjustable in respect to its guiding properties.

9. A hydropower plant according to claim 4 wherein a shaft of the water turbine is vertical.

10. A hydropower plant according to claim 9 wherein the shaft is supported by a foundation on the bed of the watercourse and the grating is supported by the same foundation as the shaft.

11. A hydropower plant according to claim 4 wherein the water turbine is arranged for a rotation in the range of 2 to 20 rpm.

12. A hydropower plant according to claim 4 wherein the plant includes a plurality of water turbines and that each turbine has an individual grating.

13. A hydropower plant according to claim 4 wherein the plant includes a plurality of water turbines and that a grating is in common for at least some of the water turbines.

14. A use of a hydropower plant according to claim 4 for generating electric energy for supply to an electric network.

15. A hydropower plant comprising:
a water turbine having a plurality of vanes extending in parallel to a rotational axis of the water turbine and connected to a shaft of the turbine via arms, the water turbine being configured to rotate in a range of 0.5-50 rpm submerged in a water current; and
a grating located adjacent the water turbine, the grating configured to prevent objects from flowing in the water form reaching the turbine,
wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
wherein the grating includes a plurality of bars defining gaps between each other, each gap forming a gap width,
wherein the gaps between the bars of the grating are substantially smaller than a tangential distance between adjacent vanes of the water turbine, and
wherein the gap width varies from one gap to another for at least some gaps and varies along the longitudinal extension of one gap.

16. A hydropower plant comprising:
a water turbine having a plurality of vanes extending in parallel to a rotational axis of the water turbine and connected to a shaft of the turbine via arms, the water turbine being configured to rotate in a range of 0.5-50 rpm submerged in a water current; and
a grating located adjacent the water turbine, the grating configured to prevent objects from flowing in the water from reaching the turbine,
wherein the grating is configured to guide the flow in the water current such that the velocity of the water between the grating and the water turbine becomes non-uniform, such that the mean velocity of the water reaching the first half is larger than the mean velocity of the water reaching the second half, and such that the velocity profile of the water reaching the water turbine has a maximum in the water tangentially reaching said first half and a minimum in the water tangentially reaching said second half,
wherein the grating includes a plurality of bars defining gaps between each other,
wherein the gaps between the bars of the grating are substantially smaller than a tangential distance between adjacent vanes of the water turbine,
wherein at least some of the bars have different distance than other bars to a plane through the rotational axis of the water turbine, which plane is perpendicular to the water flow, such that centrally located bars have a longer distance to said plane than laterally located bars, and
wherein the location of the grating is defined in relation to a tangential plane through the outer periphery of the water turbine, the tangential plane being parallel to the plane through the rotational axis of the water turbine such that the grating is located on the side of the tangential plane that is located opposite to the plane through the rotational axis.

* * * * *